United States Patent
Domokos et al.

(10) Patent No.: US 10,449,525 B2
(45) Date of Patent: *Oct. 22, 2019

(54) HYDROCARBON CONVERSION CATALYST COMPOSITION

(75) Inventors: Laszlo Domokos, Amsterdam (NL); Laurent Georges Huve, Amsterdam (NL); Hermanus Jongkind, Amsterdam (NL); Aan Hendrik Klazinga, Voorschoten (NL); Marcello Stefano Rigutto, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 655 days.

This patent is subject to a terminal disclaimer.

(21) Appl. No.: 13/881,058

(22) PCT Filed: Oct. 20, 2011

(86) PCT No.: PCT/EP2011/068329
§ 371 (c)(1),
(2), (4) Date: Apr. 14, 2014

(87) PCT Pub. No.: WO2012/055755
PCT Pub. Date: May 3, 2012

(65) Prior Publication Data
US 2014/0209506 A1 Jul. 31, 2014

(30) Foreign Application Priority Data

Oct. 25, 2010 (EP) ..................... 10306165

(51) Int. Cl.

| | | |
|---|---|---|
| *B01J 29/06* | (2006.01) | |
| *B01J 29/74* | (2006.01) | |
| *B01J 29/78* | (2006.01) | |
| *B01J 29/76* | (2006.01) | |
| *B01J 29/72* | (2006.01) | |
| *B01J 37/30* | (2006.01) | |
| *B01J 37/00* | (2006.01) | |
| *B01J 23/42* | (2006.01) | |
| *B01J 23/44* | (2006.01) | |
| *B01J 23/755* | (2006.01) | |
| *B01J 29/70* | (2006.01) | |
| *B01J 29/80* | (2006.01) | |
| *B01J 37/02* | (2006.01) | |
| *C10G 35/06* | (2006.01) | |
| *C10G 45/64* | (2006.01) | |
| *C10G 49/08* | (2006.01) | |
| *C10G 50/00* | (2006.01) | |
| *C10G 65/12* | (2006.01) | |

(52) U.S. Cl.
CPC ........... *B01J 29/7446* (2013.01); *B01J 23/42* (2013.01); *B01J 23/44* (2013.01); *B01J 23/755* (2013.01); *B01J 29/70* (2013.01); *B01J 29/703* (2013.01); *B01J 29/708* (2013.01); *B01J 29/7049* (2013.01); *B01J 29/7261* (2013.01); *B01J 29/7461* (2013.01); *B01J 29/7661* (2013.01); *B01J 29/7861* (2013.01); *B01J 29/80* (2013.01); *B01J 37/0009* (2013.01); *B01J 37/0201* (2013.01); *B01J 37/30* (2013.01); *C10G 35/065* (2013.01); *C10G 45/64* (2013.01); *C10G 49/08* (2013.01); *C10G 50/00* (2013.01); *C10G 65/12* (2013.01); *B01J 2229/16* (2013.01); *B01J 2229/186* (2013.01); *B01J 2229/20* (2013.01); *B01J 2229/37* (2013.01); *B01J 2229/42* (2013.01)

(58) Field of Classification Search
CPC .. B01J 29/703; B01J 29/7261; B01J 29/7461; B01J 29/7446; B01J 29/7661; B01J 29/7861; B01J 29/80; B01J 37/0201; B01J 37/30; B01J 37/0009; B01J 2229/16; B01J 2229/37; B01J 2229/42; B01J 2229/186; B01J 2229/20; C10G 65/12; C10G 49/08; C10G 35/065; C10G 45/64
USPC ...... 502/64, 66, 67; 208/133, 135, 137, 138; 585/477, 480, 481, 482
See application file for complete search history.

(56) References Cited

U.S. PATENT DOCUMENTS

| | | |
|---|---|---|
| 3,140,249 A | 7/1964 | Plank et al. |
| 3,140,251 A | 7/1964 | Plank et al. |
| 3,140,253 A | 7/1964 | Plank et al. |
| 4,741,891 A | 5/1988 | Casci et al. |
| 4,753,910 A | 6/1988 | Han et al. |
| 4,836,996 A | 6/1989 | Casci et al. |
| 4,876,412 A | 10/1989 | Casci et al. |
| 5,075,259 A | 12/1991 | Moran |
| 5,080,878 A | 1/1992 | Bowes et al. |
| 5,098,685 A | 3/1992 | Casci et al. |
| 5,157,191 A * | 10/1992 | Bowes ............... B01J 29/40 585/533 |
| 5,234,872 A | 8/1993 | Apelian et al. |
| 5,804,058 A * | 9/1998 | Grandvallet ........... C10G 45/64 208/108 |
| 6,576,120 B1 * | 6/2003 | Van Ballegoy .......... B01J 29/06 208/108 |
| 6,923,949 B1 | 8/2005 | Lai et al. |

(Continued)

FOREIGN PATENT DOCUMENTS

| | | |
|---|---|---|
| CN | 1703493 | 11/2005 |
| CN | 1989089 | 6/2007 |

(Continued)

Primary Examiner — Elizabeth D Wood
(74) Attorney, Agent, or Firm — Charles W. Stewart

(57) ABSTRACT

A hydrocarbon conversion catalyst composition which comprises dealuminated ZSM-48 and/or EU-2 zeolite and a refractory oxide binder essentially free of alumina, processes for preparing such composition and processes for converting hydrocarbon feedstock with the help of such compositions.

12 Claims, No Drawings

(56) References Cited

U.S. PATENT DOCUMENTS

| | | | |
|---|---|---|---|
| 7,077,948 B1* | 7/2006 | Barre | C10G 45/64 208/111.01 |
| 9,029,283 B2* | 5/2015 | Berg-Slot | B01J 23/626 502/60 |
| 2009/0166252 A1 | 7/2009 | Daage | |
| 2010/0249479 A1* | 9/2010 | Berg-Slot | B01J 23/626 585/489 |

FOREIGN PATENT DOCUMENTS

| | | | |
|---|---|---|---|
| EP | 2075314 | | 12/2007 |
| GB | 2077709 | | 12/1981 |
| WO | WO 96/41849 | * | 12/1996 |
| WO | 20000029512 | | 5/2000 |
| WO | 2005092792 | | 10/2005 |
| WO | 2007070521 | | 6/2007 |
| WO | WO 2009/016143 | * | 2/2009 |
| WO | 2010053468 | | 5/2010 |

* cited by examiner

HYDROCARBON CONVERSION CATALYST COMPOSITION

PRIORITY CLAIM

The present application claims priority from PCT/EP2011/068329, filed 20 Oct. 2011, which claims priority from European application 10306165.1, filed 25 Oct. 2010, which is incorporated herein by reference.

The invention relates to a hydrocarbon conversion catalyst composition comprising ZSM-48 and/or EU-2 zeolite, processes for preparing such catalyst composition and processes for converting hydrocarbon feedstock with the help of such compositions.

It is known from U.S. Pat. Nos. 4,741,891 and 5,075,269 that ZSM-48 and/or EU-2 zeolite are especially suitable for use in hydrocarbon conversion catalysts. As described in the Catalog of Disorder in Zeolite Frameworks published in 2000, both ZSM-48 and EU-2 zeolite belong to the family of ZSM-48 zeolites.

It has now surprisingly been found that the selectivity of ZSM-48 and/or EU-2 zeolite containing catalysts can be improved in a simple and effective way.

A further advantage is that these catalysts can use conventional ZSM-48 and/or EU-2 zeolite containing impurities and/or having a relatively high silica to alumina molar ratio. This makes that it is not required to employ pure zeolite as described in WO-A-2005/092792 or zeolite having a reduced silica to alumina molar ratio as described in WO-A-2007/070521.

The present invention relates to a hydrocarbon conversion catalyst composition which comprises dealuminated ZSM-48 and/or EU-2 zeolite and a refractory oxide binder essentially free of alumina.

Dealumination can be attained by methods known in the art, such as for example acid leaching or by a steam treatment. Steam treatment is effected by contacting the zeolite, preferably as part of a catalyst composition, with steam at elevated temperatures ranging from about 250° C. to 650° C. and preferably from about 400° C. to 550° C. The treatment can be accomplished in an atmosphere of 100% steam or in an atmosphere consisting of steam or some other gas which is essentially inert to the zeolites. A similar treatment can be accomplished at lower temperatures and elevated pressure, e.g., from 180° C. to 370° C. at from 10 to 200 atmospheres.

The expression dealumination is used to indicate that aluminium and/or aluminium containing compounds such as alumina are removed from the bulk of the zeolite. The aluminium and aluminium containing compounds can but do not need to be part of the zeolite framework.

Particularly preferred dealumination methods are those wherein the dealumination selectively occurs at the surface of the crystallites of the molecular sieve. Dealuminated zeolite particles obtained thereby have as characteristic feature that the alumina concentration at the surface is lower than the average aluminium concentration of the zeolite particle in question. For the aluminium concentration both aluminium per se and aluminium containing compounds such as alumina are to be taken into account. Dealumination can be carried out on the zeolite per se as well as on a mixture of zeolite and binder.

The average aluminium concentration of dealuminated zeolite particles of the present invention preferably is at least 1.1 times the aluminium concentration at the surface, more specifically at least 1.2, more specifically at least 1.3, more specifically at least 1.4, more specifically at least 1.5, more specifically at least 1.6, more specifically at least 1.7, most preferably at least 2 times the aluminium concentration at the surface. The aluminium concentration at the surface can be determined by any method known to those skilled in the art such as by secondary ion mass spectrometry (SIMS) or by X-ray photoelectron spectroscopy (XPS). For the present invention, XPS is to be used.

The average aluminium concentration can be determined by any one of a number of chemical analysis techniques. Such techniques include X-ray fluorescence, atomic adsorption, and inductive coupled plasma-atomic emission spectroscopy (ICP-AES). The average aluminium concentration for use in the present invention is determined by X-ray fluorescence.

Furthermore, it is preferred that the dealumination treatment reduces the acidity of the surface of the ZSM-48 and/or EU-2 particles. This acidity is to be measured by exchange with perdeuterated benzene. The dealuminated ZSM-48 and/or EU-2 particles for use in the present invention preferably have a reduced surface acidity.

Dealumination processes which selectively remove alumina from the surface of zeolites are well known in the art. For the present invention, it is preferred to choose a dealumination process from the group consisting of treating the zeolite particles with an acid which cannot enter the pores of the zeolite such as a bulky organic acid and treating the zeolite particles with a fluor containing salt.

Preferably, the acid for use in dealumination is an organic acid comprising at least 2 carbon atoms, more preferably of from 2 to 6 carbon atoms. Most preferably, the organic acid comprises 2 carboxy groups. Most preferably, the organic acid is oxalic acid. Contacting is preferably carried out at a temperature of from 10 to 100° C. during of from 1 to 10 hours. The organic acid preferably is an aqueous solution containing of from 0.01 to 1 mole organic acid/liter. The zeolite preferably is treated with such organic acid in a weight ratio of from 2:1 to 1:30 of zeolite to organic acid solution.

More preferably, the dealumination is performed by a process in which the zeolite is contacted with a solution of a fluor containing salt, such as ammonium fluoride, more specifically a compound chosen from the group consisting of fluorosilicates and fluorotitanates. These processes are described in detail in U.S. Pat. No. 4,753,910. Most preferably, the dealumination process comprises contacting the zeolite with a solution of a fluorosilicate salt wherein the fluorosilicate salt is represented by the formula:

$$(A)_{2/b}SiF_6$$

wherein 'A' is a metallic or non-metallic cation other than H+ having the valence 'b'. Examples of cations 'b' are alkylammonium, $NH_4^+$, $Mg^{++}$, $Li^+$, $Na^+$, $K^+$, $Ba^{++}$, $Cd^{++}$, $Cu^+$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$, and $Zn^{++}$. Preferably 'A' is the ammonium cation.

The solution comprising the fluorosilicate salt preferably is an aqueous solution. The concentration of the salt preferably is at least 0.005 mole of fluorosilicate salt/l, more preferably at least 0.007, most preferably at least 0.01 mole of fluorosilicate salt/l. The concentration preferably is at most 0.5 mole of fluorosilicate salt/l, more preferably at most 0.3, most preferably at most 0.1 of fluorosilicate salt/l. Preferably, the weight ratio of fluorosilicate salt solution to zeolite is of from 50:1 to 1:4 of fluorosilicate solution to zeolite. If the zeolite is present together with binder, the binder is not taken into account for these weight ratios.

The pH of the aqueous fluorosilicate containing solution preferably is between 2 and 8, more preferably between 3 and 7.

The zeolite material preferably is contacted with the fluorosilicate salt solution for of from 0.5 to 20 hours, more specifically of from 1 to 10 hours. The temperature preferably is of from 10 to 120° C., more specifically of from 20 to 100° C. The amount of fluorosilicate salt preferably is at least 0.002 moles of fluorosilicate salt per 100 grams of total amount of ZSM-48 and EU-2 zeolite, more specifically at least 0.003, more specifically at least 0.004, more specifically at least 0.005 moles of fluorosilicate salt per 100 grams of total amount of ZSM-48 and EU-2 zeolite. The amount preferably is at most 0.5 moles of fluorosilicate salt per 100 grams of total amount of ZSM-48 and EU-2 zeolite, more preferably at most 0.3, more preferably at most 0.1 moles of fluorosilicate salt per 100 grams of total amount of ZSM-48 and EU-2 zeolite. If the zeolite is present together with binder, the binder is not taken into account for these weight ratios.

The ZSM-48 and EU-2 zeolite can be dealuminated as zeolite powder. However, it is preferred that the ZSM-48 and/or EU-2 zeolite is dealuminated in admixture with the refractory oxide binder, more specifically as part of extrudates. This makes that the zeolite can be handled more easily while the presence of binder has not led to any disadvantageous side-effects.

In the present invention, the reference to ZSM-48 and EU-2 is used to indicate that all zeolites can be used that belong to the ZSM-48 family of disordered structures also referred to as the *MRE family and described in the Catalog of Disorder in Zeolite Frameworks published in 2000 on behalf of the Structure Commission of the International Zeolite Assocation. Even if EU-2 would be considered to be different from ZSM-48, both ZSM-48 and EU-2 can be used in the present invention. Zeolites ZBM-30 and EU-11 resemble ZSM-48 closely and also are considered to be members of the zeolites whose structure belongs to the ZSM-48 family. In the present application, any reference to ZSM-48 zeolite also is a reference to ZBM-30 and EU-11 zeolite.

Besides ZSM-48 and/or EU-2 zeolite, further zeolites can be present in the catalyst composition especially if it is desired to modify its catalytic properties. It has been found that it can be advantageous to have present zeolite ZSM-12 which zeolite has been defined in the Database of Zeolite Structures published in 2007/2008 on behalf of the Structure Commission of the International Zeolite Assocation.

The silica to alumina molar ratio of the ZSM-48 and/or EU-2 zeolite can influence the properties of the catalyst derived from it. The silica to alumina molar ratio ("SAR") is to be determined by bulk ratio. This ratio is also referred to as the overall ratio. Such ratio is different from the SAR of the crystalline framework. The bulk or overall ratio can be determined by any one of a number of chemical analysis techniques. Such techniques include X-ray fluorescence, atomic adsorption, and inductive coupled plasma-atomic emission spectroscopy (ICP-AES). All will provide substantially the same bulk ratio value. The silica to alumina molar ratio for use in the present invention is determined by X-ray fluorescence.

The SAR of the ZSM-48 and/or EU-2 zeolite preferably is at least 50, more specifically at least 70, more specifically at least 100, most preferably at least 150. The SAR of the ZSM-48 and/or EU-2 zeolite preferably is at most 300, more specifically at most 250, more specifically at most 230, most specifically at most 210.

The ZSM-48 and/or EU-2 zeolite can be prepared in any way known to someone skilled in the art. U.S. Pat. Nos. 5,075,269 and 4,741,891 describe suitable manufacturing methods for zeolite having a SAR of from 100 to 250.

When contents of binder and zeolite are used in the context of the present invention, the content on a dry basis is meant. The catalyst composition of the present invention preferably comprises at most 70% by weight (% wt) of zeolite, more specifically at most 65% wt, more specifically at most 60% wt, preferably at most 58% wt, most preferably at most 55% wt. These amounts preferably apply to the ZSM-48 and/or EU-2 zeolite. Further, it is preferred that the amount of ZSM-48 and/or EU-2 zeolite is at least 15% wt, more specifically at least 20% wt, more specifically at least 25% wt, most specifically at least 30% wt. If further zeolite is present besides the ZSM-48 and/or EU-2 zeolite, such zeolite preferably is present in an amount of at most 50% wt, based on amount of ZSM-48 and EU-2 zeolite which is present.

Examples of refractory oxide binder material which is essentially free of alumina are silica, zirconia, titanium dioxide, germanium dioxide, boria and mixtures of two or more of these like for example silica-zirconia and silica-titania. The binder preferably has low acidity as low acidity refractory oxide binders, preferably titania, zirconia and/or silica, tend not to interact with the zeolite. Consequently, zeolites can be bound with low acidity refractory oxides without influencing the zeolites' intrinsic activity as might occur with an acid binder such as alumina. Preferred low acidity refractory oxide binders are silica and/or titania. Although it is not desirable to have a high amount of alumina present, a certain amount of alumina can be present without immediate disadvantageous effects. In the present description, the expression essentially free of alumina indicates that at most a limited amount of alumina is to be present. The amount of alumina present in the binder, on a dry weight basis, preferably is at most 2% wt, more specifically at most 1.1% wt, more specifically at most 0.8% wt, more specifically at most 0.5% wt, more specifically at most 0.3% wt, most specifically at most 0.2% wt on basis of the binder per se.

The catalyst composition according to the present invention is preferably manufactured by preparing an extrudable mass comprising binder and ZSM-48 and/or EU-2 zeolite. This extrudable mass should have a sufficient viscosity in order to be extruded into shapes. One skilled in the art will know how to achieve such a paste like mixture. Preferably the water content of the extrudable mass does not exceed 60%, and preferably is at least 35% by weight.

If the binder is silica, it is preferred to use both silica sol and silica powder as silica source in the preparation of the composition. The silica sol can be either acidic or basic.

To obtain strong catalyst compositions, it is preferred to maximise the amount of silica sol used relative the amount of silica powder used, while still achieving a sufficient viscosity of the extrudable mass. The optimal amount of silica powder to be used will depend on the zeolite content, wherein at a low zeolite content of the catalyst, more silica powder will have to be used. One skilled in the art can easily determine the optimal composition in view of the above teaching. The silica powder may be commercially obtained silica powder, for example Sipernat 22 or 50 (as obtained from Degussa AG), Nasilco Ultrasil VN3SP or HiSil 233 EP from PPG Industries. The solid silica powder particles preferably have a mean diameter of between 10 μm and 200 μm.

Optionally a plasticising agent is added to the extrudable mass, preferably shortly before actual extrusion. The plasticiser agent is used to increase the viscosity of the mixture in order to obtain an extrudable mass. Suitable plasticising agents are for example dextrose, gelatine, glucose, glues, gums, salts, waxes, starch and cellulose ethers. Methylcellulose and/or methylcellulose derivatives are especially suited as organic binders in the practice of the present invention with methylcellulose, hydroxypropyl methylcellulose, or combinations of these being preferred. Preferred sources of cellulose ethers are Methocel A4M, F4M, F240, and K75M from Dow Chemical Co.

The extrusion may be performed by any of the well known extrusion processes. Examples of such methods are extrusion performed by a screw extruder, a plate or ram extruder. The extrudates can have a wide variety of forms and sizes.

After extrusion, the extrudates obtained are preferably subjected to drying and calcining before subjecting them to dealumination. Drying preferably takes place at a temperature of from 60° C. to 250° C., for a time sufficient to dry the extrudate, for example, for at least 1 hour. Calcining preferably takes place in air, or other inert gas, at temperatures ranging from 250° C. to 850° C. for periods of time ranging, for example, from 1 to 48 hours or more.

The thus obtained extrudates can be subjected to dealumination as described above. After dealumination, the dealuminated extrudates and binder preferably are dried for a period of from 0.5 to 10 hours at a temperature of from 50 to 300° C., more specifically of from 80 to 200° C., followed by calcination for a period of from 0.2 to 5 hours at a temperature of from 200 to 650° C., more specifically of from 350 to 600° C.

For most hydrocarbon conversion applications, one or more catalytic metals are to be incorporated into the catalyst compositions in order to make these suitable as catalysts. These catalytic metals can be incorporated in any way known to someone skilled in the art such as ion exchange. Typical ion-exchange techniques involve contacting the catalyst composition with a salt of the desired replacing ion. This can be done by for example pore volume impregnation or continuous solution impregnation. Representative ion-exchange techniques are disclosed in a wide variety of patent specifications including U.S. Pat. Nos. 3,140,249, 3,140,251 and 3,140,253. Preferably, the catalytic metals are incorporated by pore volume impregnation.

Preferably, the catalytic metals are chosen from the group consisting of metals of Groups IIA, IIB and VIII of the Periodic Table of the Elements as shown in the Handbook of Chemistry and Physics, 63$^{rd}$ edition 1983, more specifically platinum, palladium, cobalt, molybdenum, iron, tungsten and nickel. Most preferably, the one or more catalytic metals are chosen from the group consisting of platinum, palladium and nickel.

Following contact with a solution of the desired replacing ion, the catalyst composition is then preferably washed with water, and dried and calcined as described above.

The catalyst prepared by the method of this invention can find utility in a wide variety of hydrocarbon conversion processes such as hydrocracking, isomerization, hydrogenation, dehydrogenation, polymerization, reforming, catalytic hydrocracking, toluene disproportionation, and ethylbenzene conversion. The compositions of this invention can be used with or without added active metal components. Catalysts prepared by the process according the invention advantageously can be used as dewaxing catalyst under well known catalytic dewaxing conditions or in alkylaromatics isomerisation for preparing a product of increased xylene content, more specifically para-xylene content. The catalyst can also be used as part of a hydrocracker process which comprises hydrotreating followed by hydrocracking in which the lube base oil is dewaxed.

The catalysts are especially suitable for use in increasing the xylenes content, more specifically the para-xylenes content, of a hydrocarbon fraction containing aromatic hydrocarbons having 8 carbon atoms. The hydrocarbon stream preferably contains at most 60 wt % of ethylbenzene, more specifically at most 50% wt. Preferably, the hydrocarbon stream comprises at least 5% wt, more specifically at least 8% wt, preferably at least 10% wt, most preferably at least 15 wt % of ethylbenzene. The hydrocarbon stream preferably is contacted with the catalyst at a temperature in the range of from 300 to 450° C., preferably at least 350° C. and preferably at most 400° C.

Most preferably, the catalyst of the present invention is used in dewaxing. Catalytic dewaxing is used to improve cold flow properties of diesel fuels and lube oils by selective hydroisomerization/hydrocracking of normal and slightly branched paraffins. The dewaxing process reduces the pour point of the feedstock preferably by at least 10° C., more preferably by at least 20° C. The current catalysts can be used for conventional diesel fuels dewaxing to deep dewaxing (Artic grade production) in first and second stage applications, in combination with high pressure hydrocracking or mild hydrocracking catalyst package, in mild hydrocracker bottoms pour point reduction for storage and transportation and/or to produce lubes of exceptional quality.

Suitable hydrocarbon oil feeds to be employed in the process according to the present invention are mixtures of high-boiling hydrocarbons, such as, for instance, heavy oil fractions. It has been found particularly suitable to use vacuum distillate fractions derived from an atmospheric residue, i.e. distillate fractions obtained by vacuum distillation of a residual fraction which in return is obtained by atmospheric distillation of a crude oil, as the feed. The boiling range of such a vacuum distillate fraction is usually between 300 and 620° C., suitably between 350 and 580° C. However, deasphalted residual oil fractions, including both deasphalted atmospheric residues and deasphalted vacuum residues, may also be applied. If the vacuum distillate fractions contain substantial amounts of sulphur- and nitrogen-containing contaminants, for example, having sulphur levels up to 3% by weight and nitrogen levels up to 1% by weight, it may be advantageous to treat this feedstock to a hydrodesulphurisation and hydrodenitrogenation step prior to the catalytic dewaxing process according to the present invention.

Dewaxing generally comprises contacting feedstock with a catalyst according to the present invention at a temperature of up to 450° C., more specifically of from 250 to 400° C., preferably of from 275 to 350° C., and a total pressure of from 5 to $200 \times 10^5$ Pa, more specifically of from 15 to $170 \times 10^5$ Pa, preferably of from 25 to $150 \times 10^5$ Pa. The liquid hourly space velocity preferably is in the range of from 0.1 to 10 h$^{-1}$.

The feedstock to be subjected to dewaxing preferably is a gas oil or a lube oil basestock. The feedstock preferably is a lube oil base stock. The feedstocks preferably are wax-containing feeds that boil in the lubricating oil range typically having a 10% distillation point at 200° C. or higher as measured by ASTM D-2887-93. Examples of feeds having relatively high amounts of waxy compounds are synthetic waxy raffinates (Fischer-Tropsch waxy raffinates), hydrocracker bottom fractions (hydrowax), i.e. those fractions having a final boiling point of at least 320° C., preferably at least 360° C. and slack waxes obtained from the dewaxing of hydroprocessed or solvent refined waxy distillates. These feeds have a wax content of at least 50% by weight, preferably at least 80% by weight and more preferably at least 90% by weight. The wax content is the content of compounds which are plastic at ambient temperature and melt above 45° C. to give a low viscosity liquid. The amount of wax can be determined by the ASTM method D3235.

The process of the present invention can be used to prepare lubricating base oils having viscosity indices (VI) above 120 and particularly above 135.

Furthermore, the feedstocks may have been hydrotreated and/or hydrocracked before being subjected to dewaxing.

Hydrotreating generally involves contacting feedstock with a hydrotreating catalyst at a temperature of up to 500° C., more specifically of from 250 to 500° C., and a hydrogen partial pressure of from 10 to $200 \times 10^5$ Pa, more specifically of from 30 to $130 \times 10^5$ Pa.

Hydrocracking generally involves contacting feedstock with a hydrocracking catalyst at a hydrogen partial pressure (at the reactor inlet) in the range from $3 \times 10^6$ to $2.9 \times 10^7$ Pa, more preferably from $8 \times 10^6$ to $1.75 \times 10^7$ Pa and a ratio of hydrogen gas to feedstock (total gas rate) in the range from 100 to 5000 Nl/kg, but preferably in the range from 200 to 3000 Nl/kg.

The method of the invention will now be illustrated by the following non-limiting example.

EXAMPLE 1

Zeolite EU-2 having a SAR of 158 was prepared as described in U.S. Pat. No. 4,741,891. An extrudable mass was prepared by combining 25 wt % EU-2, 50 wt % of amorphous precipitated silica powder (Sipernat-50 as obtained from Degussa) and 25 wt % of an ammonium stabilized commercially available silica sol (sold under the trade name Bindzil 30NH$_3$/220 by Eka Chemicals). The weight amounts are basis dry components. The mass was extruded to give extrudates having a cylinder shape and an average diameter of 1.6 mm. These extrudates were dried at 120° C. and calcined at 625° C. for 1 hour resulting in white extrudates.

These extrudates were treated unstirred at a temperature of 90° C. for 5 hours with 0.02 M aqueous ammonium hexafluorosilicate (AHS) solution. The weight ratio of solution to extrudates was 5:1. Subsequently the extrudates were separated from the solution, washed with deionized water and dried at 120° C. during 2 hours followed by calcination at 500° C. during 1 hour.

Hereafter 0.7% wt/wt platinum was incorporated into the composition by pore volume impregnation during about 10 minutes with an aqueous solution containing tetramine platinum nitrate (Pt(NH$_3$)$_4$(NO$_3$)$_2$) (3.37% w/w Pt).

The impregnated composition was not washed, but equilibrated during 1.5 hours on a rolling bed, dried for 10 minutes at 180° C. (ramprate 15° C./minute); whereafter the temperature was raised again with 30° C./minute to 290° C. (internal 270° C.) and held stable during 12 minutes. Hereafter the catalyst was cooled down to room temperature.

EXAMPLE 2

The catalyst of Example 1 was dried at 250° C. for 3 hours. Subsequently, the catalyst was mixed with sufficient inert material to assure proper plug flow conditions and loaded into a single tube test reactor of down flow mode.

Subsequently, a hydrogen partial is applied of 60 bar and then the temperature is increased from room temperature to 125° C. at a rate of 20° C./h, and held for two hours. The temperature is increased further to 300° C. at a rate of 50° C./h, and held for 8 hours to ensure proper reduction of the metallic phase. The reactor is cooled to 200° C. and then the feed of Table 1 is introduced. After feed break through the temperature is increased to 250° C. in 4 hours, and held overnight.

The temperature is adjusted to obtain a cloud point improvement of 35° C. which means that the product has a cloud point which is 35° C. lower than the cloud point of the feedstock. The cloud points are measured according to ASTM D 2500. The feed of Table 1 was added at a weight hourly space velocity of 2.5 h$^{-1}$.

The performance of the catalyst is shown in Table 2. The expression % wof stands for the % wt on feed, C$_5^+$ yield stands for the amount of product containing 5 or more carbon atoms, C$_3$-C$_4$ yield stands for the amount of product containing 3 or carbon atoms and 177° C.$^+$ stands for product having a boiling point above 177° C. measured according to ASTM D-2887. Table 2 shows the performance of the catalyst according to Example 1 and the performance of a commercially available dewaxing catalyst under similar conditions.

TABLE 1

| Feed | | |
|---|---|---|
| Density at 15/4° C. | g/ml | 0.8477 |
| Carbon content | % w | 86.47 |
| Hydrogen content | % w | 13.53 |
| Sulphur content, | % w | 0.0030 |
| Nitrogen content, | ppmw | 1.4 |
| UV Aromatics | | |
| Mono-aromatics | mmol/100 g | 94.7 |
| Di-aromatics | mmol/100 g | 3.06 |
| Tri-aromatics | mmol/100 g | 2.35 |
| Tetra$^+$-aromatics | mmol/100 g | 0.50 |
| Pour Point | ° C. | +3 |
| Cloud Point | ° C. | +8 |
| TBP-GLC | | 580 |
| 0.5% w recovery (IBP) | ° C. | 112 |
| 10% w recovery | ° C. | 237 |
| 90% w recovery | ° C. | 392 |
| 98% w recovery | ° C. | 419 |
| 99.5% w recovery | ° C. | 439 |

TABLE 2

| | Unit | Commercial catalyst | Example 1 |
|---|---|---|---|
| T$_{required}$ | ° C. | 335 | 369 |
| C$_5^+$ yield | % wof | 99.8 | 99.9 |
| C$_3$-C$_4$ yield | % wof | 0.9 | 0.7 |
| 177° C.$^+$ | % wof | 90 | 93 |
| H$_2$ consumption | % wof | 0.68 | 0.63 |

It is clear from the above that the catalyst according to the present invention gives an improved dewaxed gas oil yield (product having a boiling point above 177° C.) while the light gas make (C$_3$-C$_4$ yield) and hydrogen consumption are lower. Admittedly, the activity of the catalyst according to the invention is slightly lower but for many applications this will be offset by the selectivity gain obtained.

EXAMPLE 3

Zeolite EU-2 having a SAR of 157 was prepared as described in U.S. Pat. No. 4,741,891. An extrudable mass was prepared by combining 35 wt % EU-2, 40 wt % of amorphous precipitated silica powder (Sipernat-50 as obtained from Degussa) and 25 wt % of an ammonium stabilized commercially available silica sol (sold under the trade name Bindzil 30NH$_3$/220 by Eka Chemicals) with water, ammonia and extrusion aids. The weight amounts of EU-2 and the silica containing components are basis dry components. The mass was extruded to give extrudates having a cylinder shape and an average diameter of 1.8 mm. These extrudates were dried at 120° C. and calcined at 625° C. for 1 hour resulting in white extrudates.

These extrudates were treated unstirred at a temperature of 90° C. for 5 hours with 0.01 M aqueous ammonium hexafluorosilicate (AHS) solution. The weight ratio of solution to extrudates was 5:1. Subsequently the extrudates were separated from the solution, washed with deionized water and dried at 120° C. during 2 hours followed by calcination at 500° C. during 1 hour.

Hereafter 0.7% wt/wt platinum was incorporated into the composition by pore volume impregnation with an aqueous solution containing tetramine platinum nitrate (Pt(NH$_3$)$_4$(NO$_3$)$_2$) (3.05% w/w Pt).

The impregnated composition was not washed, but equilibrated during 1.5 hours on a rolling bed, dried for 10 minutes at 180° C. (ramprate 15° C./minute) whereafter the temperature was raised again with 30° C./minute to 290° C. (internal 265-270° C.) and held stable during 12 minutes. Hereafter the catalyst was cooled down to room temperature.

EXAMPLE 4

Zeolite EU-2 having a SAR of 157 was prepared as described in U.S. Pat. No. 4,741,891. An extrudable mass was prepared by combining 50 wt % EU-2, 25 wt % of amorphous precipitated silica powder (Sipernat-50 as obtained from Degussa) and 25 wt % of an ammonium stabilized commercially available silica sol (sold under the trade name Bindzil 30NH$_3$/220 by Eka Chemicals) with water, ammonia and extrusion aids. The weight amounts of EU-2 and the silica containing components are basis dry components. The mass was extruded to give extrudates having a cylinder shape and an average diameter of 1.8 mm. These extrudates were dried at 120° C. and calcined at 625° C. for 1 hour resulting in white extrudates.

These extrudates were treated at elevated temperature for 5 hours with 0.015 M aqueous ammonium hexafluorosilicate (AHS) solution and subsequently separated from the solution, washed with deionized water and dried. Subsequently, the extrudates are calcined at 500° C. during 1 hour.

Hereafter 0.7% wt/wt platinum was incorporated into the composition by pore volume impregnation with an aqueous solution containing tetramine platinum nitrate (Pt(NH$_3$)$_4$(NO$_3$)$_2$) (3.05% w/w Pt).

The impregnated composition was not washed, but equilibrated during 1.5 hours on a rolling bed, dried for 10 minutes at 180° C. (ramp rate 15° C./minute) whereafter the temperature was raised again with 30° C./minute to 290° C. (internal 265° C.) and held stable during 12 minutes. Hereafter the catalyst was cooled down to room temperature.

What is claimed is:

1. A dewaxing or alkylaromatics isomerization catalyst composition, which consists essentially of:
    a dealuminated dried and calcined extrudate, obtained from a dried and calcined extrudate, wherein the extrudate, before drying and calcination, comprises a binder that is essentially free of alumina and which comprises both silica powder, wherein said silica powder comprises powder particles having a mean diameter between 10 μm and 200 μm, and a silica sol; EU-2 zeolite, wherein said EU-2 zeolite has a silica-to-alumina molar bulk ratio before the dealumination of said dried and calcined extrudate in the range of from 100 to 210; a plasticising agent; and water in an amount of at least 35% and not exceeding 60% by weight of the extrudate before drying and calcination; and
    a catalytic metal selected from the group consisting of platinum, palladium and nickel;
    wherein the dealumination of said dried and calcined extrudate is done by contacting said dried and calcined extrudate with an aqueous solution of fluorosilicate salt having a concentration of at least 0.005 mole of fluorosilicate salt/liter and at most 0.5 mole of fluorosilicate salt/liter and at a temperature in the range of from 10° C. to 120° C., and
    wherein the amount of said EU-2 zeolite present in said hydroconversion catalyst composition is at least 15% wt of said hydrocarbon conversion catalyst composition; and
    wherein the EU-2 zeolite is in the form of EU-2 zeolite particles, where the average aluminum concentration of the EU-2 zeolite particles is at least two times the aluminum concentration at the surface of the particles.

2. The catalyst composition according to claim 1, wherein the zeolite content, on a dry basis, is of from 20 to 70 wt % as calculated on the total of said dewaxing or alkylaromatics isomerization catalyst composition.

3. The catalyst composition according to claim 1, wherein said fluorosilicate salt of said fluorosilicate salt solution is represented by the formula:

wherein 'A' is a metallic or non-metallic cation other than H+ having the valence 'b'.

4. A process for converting a hydrocarbon feedstock which process comprises contacting the feedstock with a catalyst composition according to claim 1 at a temperature of from 100 to 600° C. and a pressure of from 1 to 100 bara.

5. A process according to claim 4 in which process the feedstock has a 10% distillation point greater than 343° C. measured by ASTM D-2887-93.

6. The catalyst composition according to claim 2, wherein the plasticizing agent is selected from the group consisting of dextrose, gelatin, glucose, glues, gums, salts, waxes, starch and cellulose ethers.

7. The catalyst composition according to claim 6, wherein said binder contains at most 2% wt alumina, based on dry weight of the binder per se.

8. The catalyst composition according to claim 7, wherein said binder contains at most 1.1% wt alumina, based on dry weight of the binder per se.

9. The catalyst composition according to claim 8, wherein said extrudate further comprises zeolite ZSM-12 that is present therein in an amount of at most 50% wt, based on the amount of EU-2 zeolite present.

10. The catalyst composition according to claim 9, wherein the amount of EU-2 zeolite is at least 25% wt and at most 65% wt.

11. The catalyst composition according to claim 10, wherein said plasticizing agent is methylcellulose or a methylcellulose derivative.

12. The catalyst composition according to claim 11, wherein said binder contains at most 0.2% wt alumina, based on dry weight of the binder per se.

* * * * *